(12) United States Patent
Martin et al.

(10) Patent No.: US 9,747,617 B1
(45) Date of Patent: Aug. 29, 2017

(54) PROVISION OF WIRELESS DEVICE ACTIVITY INFORMATION TO A THIRD PARTY BASED ON ACCEPTANCE OF AN OFFER PRESENTED TO A USER

(71) Applicant: Sprint Communications Company L.P., Overland Park, KS (US)

(72) Inventors: Geoffrey S. Martin, Overland Park, KS (US); Jeffrey M. Haydon, Kansas, MO (US); Ryan Kent Hannebaum, Prairie Village, KS (US); Krishnakumar K. Bhaskarankutty Nair, Olathe, KS (US); Thomas E. Anderson, Seattle, WA (US)

(73) Assignee: Sprint Communications Company L.P., Overland Park, KS (US)

( * ) Notice: Subject to any disclaimer, the term of this patent is extended or adjusted under 35 U.S.C. 154(b) by 653 days.

(21) Appl. No.: 13/923,652

(22) Filed: Jun. 21, 2013

(51) Int. Cl.
*G06Q 30/00* (2012.01)
*G06Q 30/02* (2012.01)

(52) U.S. Cl.
CPC ..... *G06Q 30/0267* (2013.01); *G06Q 30/0201* (2013.01)

(58) Field of Classification Search
CPC combination set(s) only.
See application file for complete search history.

(56) References Cited

U.S. PATENT DOCUMENTS

| | | | |
|---|---|---|---|
| 2001/0034651 A1* | 10/2001 | Marks | G06Q 30/02 705/14.23 |
| 2008/0077489 A1* | 3/2008 | Gilley | G06Q 30/02 705/14.11 |
| 2008/0139112 A1 | 6/2008 | Sampath et al. | |
| 2009/0198580 A1* | 8/2009 | Broberg | G06Q 30/02 705/14.1 |
| 2009/0221287 A1 | 9/2009 | Balasubramanian et al. | |
| 2010/0082652 A1* | 4/2010 | Jones | G06Q 30/02 707/758 |
| 2010/0227649 A1* | 9/2010 | Lestreus | G06Q 30/02 455/566 |
| 2010/0228594 A1* | 9/2010 | Chweh | G06Q 30/00 705/14.41 |
| 2011/0028137 A1* | 2/2011 | Moshrefi | G06Q 30/02 455/418 |
| 2011/0161163 A1* | 6/2011 | Carlson | G06Q 30/02 705/14.44 |
| 2011/0191246 A1* | 8/2011 | Brandstetter | G06Q 30/02 705/59 |

(Continued)

*Primary Examiner* — Matthew T Sittner (57) ABSTRACT

Embodiments disclosed herein provide systems and methods for providing wireless device activity information to a third party based on acceptance of an offer presented to a user. In a particular embodiment, a method provides detecting an occurrence of one of a plurality of trigger conditions, wherein each of the trigger conditions corresponds to at least one activity performed by a wireless communication device. In response to detecting the occurrence, the method provides presenting a user of the wireless communication device with an offer to provide device activity information for the wireless communication device to a third party. The method further provides receiving a response to the offer from the user, wherein the response comprises an indication of whether the user desires to accept the offer.

10 Claims, 7 Drawing Sheets

(56) References Cited

U.S. PATENT DOCUMENTS

| | | | | |
|---|---|---|---|---|
| 2012/0089465 A1* | 4/2012 | Froloff | G06Q 30/02 | 705/14.71 |
| 2012/0123865 A1* | 5/2012 | Salzano | G06Q 30/0257 | 705/14.55 |
| 2012/0215637 A1* | 8/2012 | Hermann | G06Q 30/0207 | 705/14.53 |
| 2013/0138716 A1* | 5/2013 | Macwan | G06Q 30/02 | 709/203 |
| 2013/0159095 A1* | 6/2013 | Formo | G06Q 30/0278 | 705/14.49 |
| 2013/0275208 A1* | 10/2013 | Flake | G06Q 30/02 | 705/14.45 |
| 2013/0325569 A1* | 12/2013 | Holmes | G06Q 20/123 | 705/14.13 |
| 2014/0074615 A1* | 3/2014 | Hope | G06Q 30/0241 | 705/14.64 |

* cited by examiner

PROVISION OF WIRELESS DEVICE ACTIVITY INFORMATION TO A THIRD PARTY BASED ON ACCEPTANCE OF AN OFFER PRESENTED TO A USER

TECHNICAL BACKGROUND

A wireless communication network has the capability of monitoring various activities of wireless devices using the network to exchange communications. The activities range from location/movement of the devices, applications used by the devices, content transferred/received by the devices, and services used by the devices, among many other possible device activities. Many third party entities, such as businesses, would be interested to know these activities in order to use the information for the entities' benefit. However, concerns for the privacy of users of the wireless devices prevents the wireless network operator from allowing third parties to access the activity information. Moreover, even if a user of a wireless device were to give permission to the wireless network operator to provide some or all of the device's activity information to a third party, the information from that particular device may not be relevant to the third party.

OVERVIEW

Embodiments disclosed herein provide systems and methods for providing wireless device activity information to a third party based on acceptance of an offer presented to a user. In a particular embodiment, a method provides detecting an occurrence of one of a plurality of trigger conditions, wherein each of the trigger conditions corresponds to at least one activity performed by a wireless communication device. In response to detecting the occurrence, the method provides presenting a user of the wireless communication device with an offer to provide device activity information for the wireless communication device to a third party. The method further provides receiving a response to the offer from the user, wherein the response comprises an indication of whether the user desires to accept the offer.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
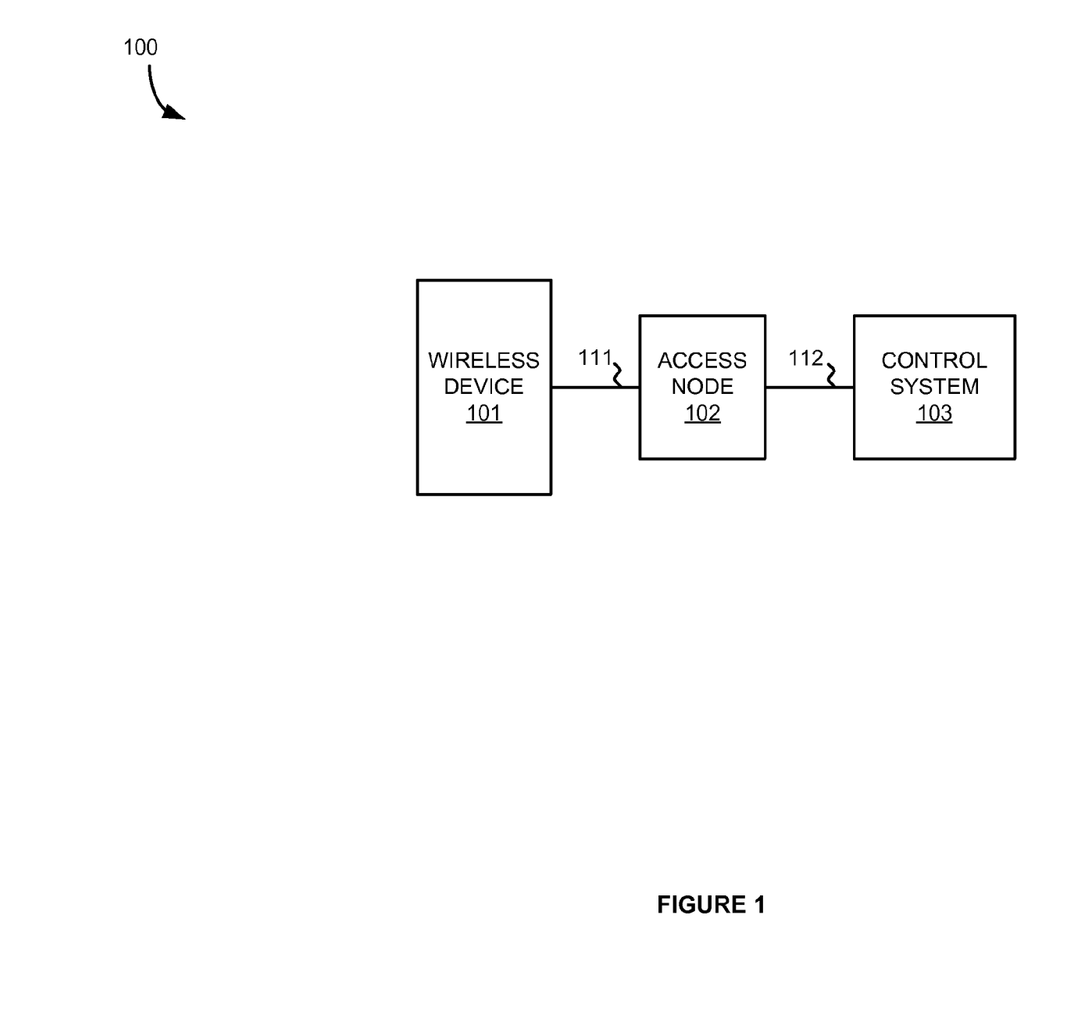
FIG. 1 illustrates a wireless communication system for providing wireless device activity information to a third party based on acceptance of an offer presented to a user.

FIG. 1 illustrates wireless communication system 100. Wireless communication system 100 includes wireless communication device 101, wireless access node 102, and communication control system 103. Wireless communication device 101 and wireless access node 102 communicate over wireless link 111. Wireless access node 102 and communication control system 103 communicate over communication link 112.

In operation, access node 102 and control system 103 may be part of a wireless communication network of which wireless device 101 is a subscriber device. Access node 102 provides wireless device 101 with access to the wireless network to provide services to wireless device 101. The services may include voice, text, data, or any other possible service that can be provided by a wireless network—including combinations thereof.

While providing services to wireless device 101, the wireless network may be able to track activities of wireless device 101. The activities may include locations visited by wireless device 101, services used by wireless device 101, how those services are used by wireless device 101, applications used by wireless device 101, actions performed within the applications used by wireless device 101, or some other type of device activity—including combinations thereof. Many third party entities may find the activities of wireless device 101, and possibly other wireless devices, useful in the entities' own operations. For example, a retail company may be interested in whether a user of wireless device 101 visited a competitors website while wireless device 101 was located near one of the retail company's stores.

Despite a third party's potential interest in the activity information of wireless devices, wireless networks do not provide activity information in order to protect the privacy of wireless device users. If, however, the user gave his or her consent to providing the activity information to the third party, then the wireless network would be free to provide the information to the third party.

Figure 2:
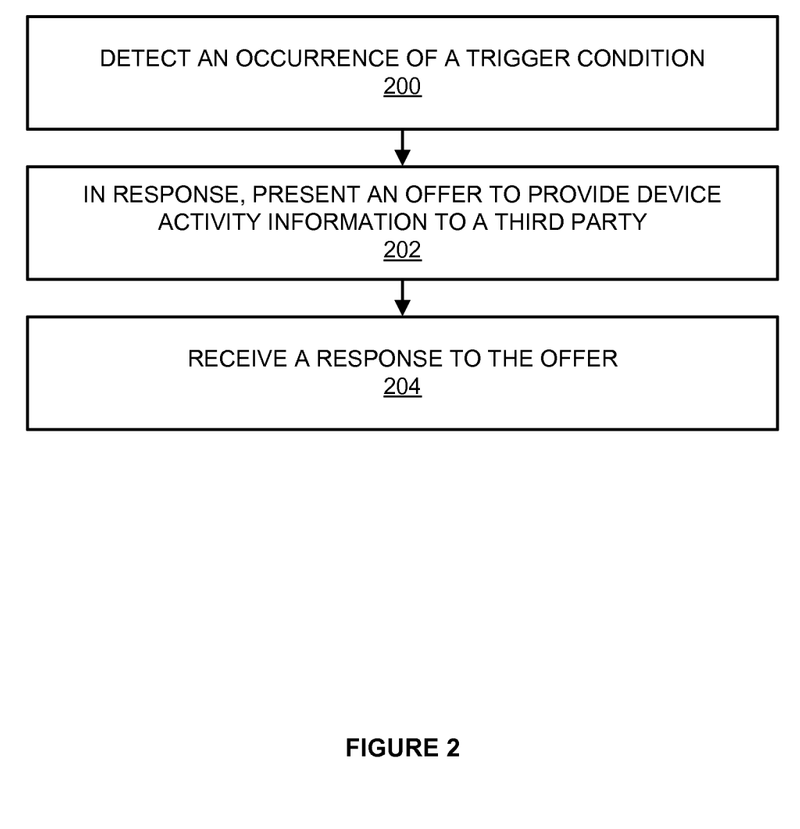
FIG. 2 illustrates an operation of the wireless communication system for providing wireless device activity information to a third party based on acceptance of an offer presented to a user.

FIG. 2 illustrates an operation of wireless communication system 100 for providing wireless device activity information to a third party based on acceptance of an offer presented to a user. In step 200, an occurrence of a trigger condition is detected. Each of the trigger conditions corresponds to at least one activity performed by wireless device 101. The at least one activity defined by the trigger condition may be a location entered or left by wireless device 101, a sequence of locations entered and/or left by wireless device 101, a wireless service used by wireless device 101 (e.g. data, voicemail, messaging, etc.), a sequence of services used by wireless device 101, an application executed on wireless device 101 (e.g. web browser, game, calendar, etc.), an activity or sequence of activities performed by that application and/or other applications on wireless device 101, a phone call placed/received by wireless device 101, a sequence of phone calls, data usage, timing of the activity, or any other possible activity that may be performed by a wireless device—including combinations thereof.

In a particular example, one of the trigger conditions may define the at least one activity as being a when a web browser of wireless device 101 is directed to visit a particular website within a particular location during a particular time of day. In another example, the at least one activity comprises wireless device 101 executing an application associated with one entity and then executing an application associated with another, possibly competing entity, with a period of time thereafter. In yet one more example, the at least one activity comprises wireless device 101 placing a call to a particular telephone number while moving from one access node to another. Numerous other possible activity combinations may also apply.

The trigger conditions may be provided to control system 103 by a third party over a communication link with control system 103. In one example, a human administrator for the third party may provide a computer system with the trigger conditions, which may be based on wireless device activities that the third party considers relevant. In other words, the trigger conditions may be activities that the third party believes would be initiated by a wireless device user who would be of interest to the third party. The trigger conditions may be transferred from the third party's computer system to control system 103 over a communication link using a proprietary protocol, an email message, or any other way of transferring data between two computing systems. Alternatively, the third party may provide the trigger conditions to an administrator of control system 103 and that administrator enters the trigger conditions into control system 103.

In some embodiments, control system 103 detects the occurrence of the trigger condition. In those embodiments, control system 103 monitors the activities of wireless device 101. For example, control system 103 may monitor which access node wireless device 101 is using to access the wireless network to determine the location of wireless device 101 and/or may receive location updates, such as geographic coordinates, transferred from wireless device 101. Additionally, control system 103 may monitor communications traffic exchanged with wireless device 101 to determine activities being performed by wireless device 101. For example, control system 103 may recognize a website URL transferred from wireless device 101 in order to determine a particular website that is being visited by wireless device 101. Similarly information within data packets from wireless device 101 may indicate an application being used on wireless device 101. In some cases, wireless device 101 may be configured to transfer indications of at least a portion of its activities to control system 103 when those activities cannot be otherwise determined by control system 103 monitoring wireless device 101's activities on the network side.

In alternative embodiments, control system 103 may transfer the trigger conditions to wireless device 101 so that wireless device 101 itself is able to monitor for the occurrence of the trigger condition. In such embodiments, an application, or other item of software/firmware, executing on wireless device 101 will monitor activities being performed by wireless device 101 for the occurrence of the trigger condition.

In response to detecting the occurrence, step 202 provides that a user of the wireless communication device is presented with an offer to provide device activity information for wireless device 101 to a third party. In embodiments where control system 103 detects the occurrence of the trigger condition, control system 103 transfers a notification to wireless device 101 that the trigger condition has occurred and wireless device 101 presents the offer to the user of wireless device 101. Details of how the offer itself should be presented and what should be included in the offer may already be stored on wireless device 101 (e.g. the offer information may have been previously received from control system 103 or elsewhere) or control system 103 may transfer the offer information as part of or along with the notification.

In embodiments where wireless device 101 detects the occurrence of the trigger condition, if wireless device 101 already has offer information stored thereon, then wireless device 101 presents the offer to the user. If wireless device 101 does not have offer information stored thereon, then wireless device 101 may transfer a indicator of the trigger's occurrence to control system 103, which will responsively transfer the offer information to wireless device 101. A similar indicator may also be transferred when wireless device 101 already has the offer information to keep control system 103 informed about trigger occurrences.

To present the offer, wireless device 101 may already have a built in notification system (e.g. a notification element of the operating system for wireless device 101), the notification system may be provided as a separate application installed on wireless device 101, using an application already present on wireless device 101 (e.g. a text message or email application), or any other way of presenting information to a user of a wireless device—including combinations thereof. Presentation of the offer may comprise a visual and/or audio indication of the offer to the user. For example, the offer may comprise a popup notification of the offer, which may be accompanied by a sound and/or a vibrate alert. In an alternative example, control system 103 may transfer the offer notification in the form of a text message that is presented to the user in the typical manner in which wireless device 101 presents text messages to the user.

Regardless, of how the offer is presented, the offer asks the user if the user would like to provide device activity information to a third party. In doing that, the offer may indicate the identity of the third party, what type(s) of activity information will be provided to the third party, any consideration that will be provided to the user for the user's acceptance, what at least one activity triggered the user's receipt of the offer, or any other information pertaining to the offer—including combinations thereof. Furthermore, the presentation of the offer allows the user to provide input as to whether the user would like to accept the offer. Depending on how the offer is presented, the user may be able to interact with the offer notification itself (e.g. pressing an on screen button within an offer popup notification indicating that the user would like to accept or decline the offer), may be linked to another application to accept or decline the offer (e.g. a URL link that opens a web page in a web browser application to accept or decline the offer), instructions for how the user may accept the offer (e.g. open a particular application and perform certain actions in that application), or any other means for accepting user input.

In step 204, a response to the offer is received from the user. The response comprises an indication of whether the user desires to accept the offer. The response may be received directly from wireless device 101 or the response may be received via an intermediary system (e.g. a web server for a website used to accept the offer). If the response indicates that the user declines the offer, then control system 103 will not provide any activity information for wireless device 101 to the third party. After the negative response from the user, control system 103 (or wireless device 101) may continue to monitor activities of wireless device 101 to present future offers to the user or the monitoring of activities may be stopped. An indication of whether the user would like to receive future offers may be included in the response to the offer.

However, if the response indicates that the user accepts the offer, then control system 103 provides the third party with the activity information. Control system 103 may maintain a record of activity information for wireless device 101 that is stored as a result of monitoring wireless device 101 for the trigger conditions or some other reason. In those cases, control system 103 may simply provide at least a portion of the stored activity information to the third party. Alternatively, or additionally, the activity information shared with the third party may correspond to activities performed by wireless device 101 after acceptance of the offer. Control system 103 will monitor future activities in a manner similar to that described above when monitoring for trigger conditions.

The activity information provided by to the third party may include information about calls made by wireless device 101, locations visited by wireless device 101, application(s) used by wireless device 101, details about how the application(s) are used, services used by wireless device 101, details about how the services are used, or any other type of information regarding activities of a wireless device—including combinations thereof. The type(s) of activity information provided to the third party may be requested by the third party at the same time the third party provided control system 103 with the trigger conditions. Alternatively, the type(s) of activity information may be received by control system 103 at some other time or the third party may not have the ability to choose the type(s) of activity information. Likewise, the third party may be able to designate a precision of the activity information, a time frame for provision of activity information for wireless device 101, or any other qualifiers for the activity information—including combinations thereof. For example, for example the third party may indicate that it desires location information in the activity information to indicate at least the zip code of wireless device 101 (as opposed to city, county, etc.) and that it wants to know a specific web browser used to access a particular website (as opposed to a generic indication that a web browser was used). In another example, the third party may designate that it desires activity information collected in an upcoming time period (e.g. the next day or month), activity information already collected in a previous time period, or any other time period designation.

In some embodiments, the user's response to the offer may include conditions on the acceptance of the offer. The conditions may limit the type(s) of activity information provided to the third party, the precision of the activity information, the time period for providing the activity information, or any other limitation on how the activity information that is provided to the third party. Thus, while the third party may request certain parameters for the activity information, the user in these embodiments is able to limit the requested parameters. The same mechanism used by the user of wireless device 101 to accept the offer may also be used to indicate the conditions. Some embodiments present possible conditions to the user and the user is then able to select from the possible conditions, although, other means of indicating conditions may also me used.

It should be understood that, while the above embodiments only discuss one wireless device, many wireless devices may be monitored for the trigger conditions so that the third party may be able to receive activity information from multiple wireless devices upon user acceptance of an offer presented at each respective device. Likewise, additional third parties may exist that provide different trigger conditions for presenting activity information offers to the wireless devices.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, eNode B, Internet access node, telephony service node, wireless data access point, or some other wireless communication system—including combinations thereof.

Communication control system 103 comprises a computer system and communication interface. Communication control system 103 may also include other components such as a router, server, data storage system, and power supply. Communication control system 103 may reside in a single device or may be distributed across multiple devices. Communication control system 103 is shown externally to wireless access node 102, but system 103 could be integrated within the components of wireless access node 102. Communication control system 103 could be a mobile switching center, network gateway system, Internet access node, application server, service node, or some other communication system—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
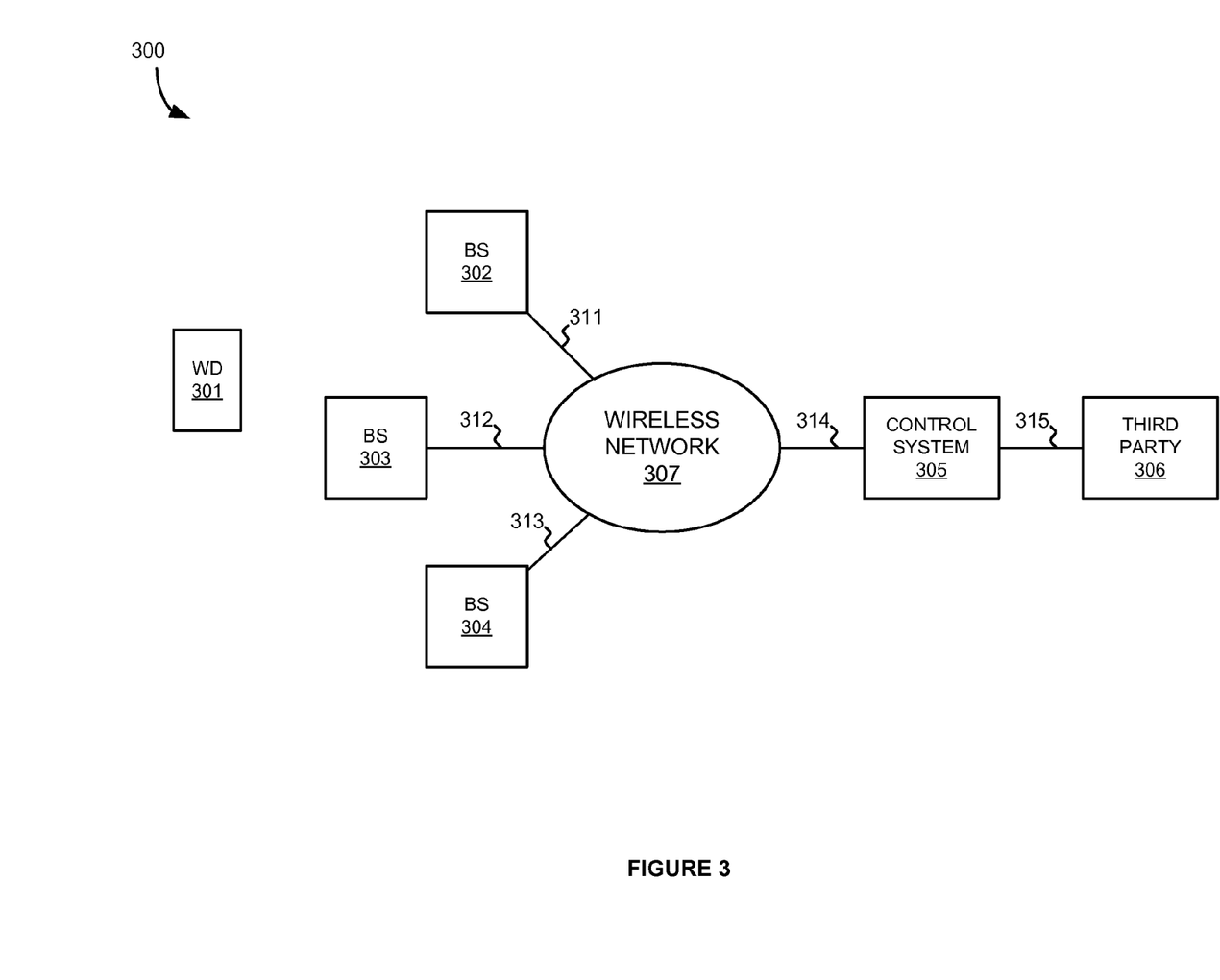
FIG. 3 illustrates a wireless communication system for providing wireless device activity information to a third party based on acceptance of an offer presented to a user.

FIG. 3 illustrates wireless communication system 300. Wireless communication system 300 includes wireless communication device 301, wireless base stations 302-304, communication control system 305, third party system 306, and wireless communication network 307. Wireless base stations 302-304 and wireless communication network 307 communicate over communication links 311-313, respectively. Wireless communication network 307 and communication control system 305 communicate over communication link 314. Communication control system 305 and third party system 306 communicate over communication link 315. Wireless communication device 301 communicates with base stations 302-304 over wireless links with each base station.

Figure 4:
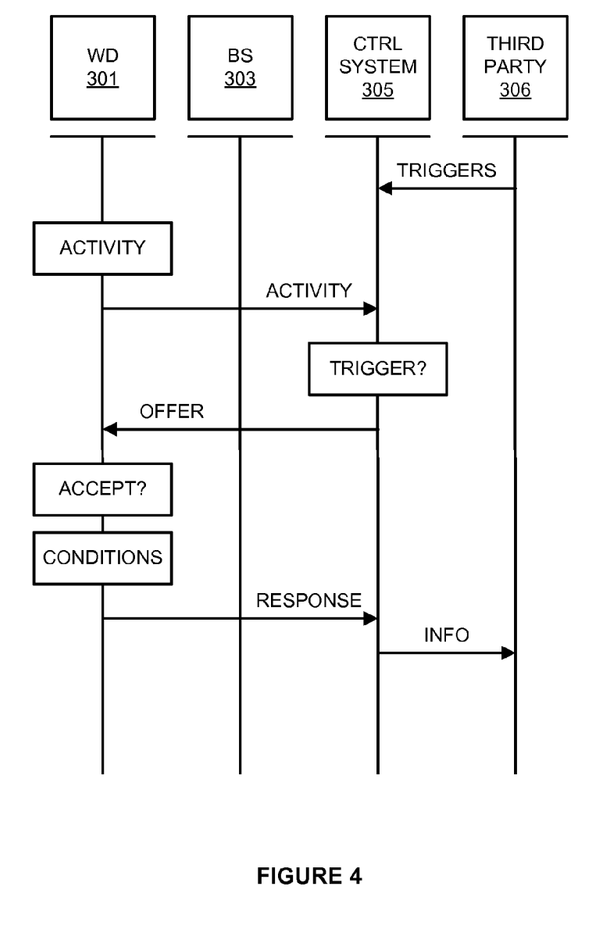
FIG. 4 is a sequence diagram illustrating an operation of the wireless communication system for providing wireless device activity information to a third party based on acceptance of an offer presented to a user.

FIG. 4 is a sequence diagram illustrating an operation of wireless communication system 300 for providing wireless device activity information to a third party based on acceptance of an offer presented to a user. The sequence begins with third party system 306 transferring at least one trigger condition to control system 305. The trigger conditions include any number of activities or activity sequences that should cause an offer for activity information to be presented to a user of a wireless device that satisfies at least one of those trigger conditions. In one example, an entity associated with third party system 306 may desire device activity information about any wireless device that enters a particular location in order to process the activity information to infer demographic characteristics of people in the area based on device activity information. One of the trigger conditions may therefore comprise a wireless device moving into the location, which may be designated as a base station coverage area, city, zip code, or some other means of designating a location. Other triggers conditions could comprise other locations of interest to the entity or other activities relating to or not relating to device location, as discussed previously.

Upon receiving the trigger conditions from third party system 306, control system 305 monitors activities performed by wireless devices communicating with wireless network 307. In this embodiment, the activities are monitored via communications exchanged by the devices with wireless network 307. The communications may be exchanged directly with a system of wireless network 307, such as a service request, or communications exchanged with systems outside of wireless network 307, such as a web server. For example, control system 305 may infer the location of a wireless device based on the location of the base station servicing the wireless device and then determine an application in use by the wireless device using application identifiers in communication traffic with the device.

In this embodiment, wireless device 301, being one of the wireless devices communicating with wireless network 307, performs an activity (or activities) and that activity is recognized by control system 305, which in turn determines whether the activity satisfies one of the trigger conditions. Following an example from above, the activity may be wireless device 301 moving from the service area of base station 302 to the service area of base station 303. Control system 305 may recognize this movement when wireless device 301 registers to exchange communications through base station 303. Upon determining that the activity performed by wireless device 301 does not satisfy a trigger condition, control system 305 continues to monitor activities performed by wireless device 301 to determine whether any future activities satisfy a trigger condition.

Upon determining that the activity performed by wireless device 301 does satisfy a trigger condition, control system 305 transfers, to wireless device 301, an offer to provide activity information to third party system 306. Wireless device 301 presents the offer to a user of wireless device 301 and the user is then able to indicate whether the user wishes to accept the offer or decline the offer. If the user indicates acceptance of the offer, wireless device 301 presents possible conditions that the user may put on the provision of the activity information. For example, wireless device 301 present the user with the scope of activity information requested by third party 306 and the user has the option of limiting various aspects of that scope. Allowing the user to impose limitations may provide the user with enough assurances that his or her privacy can be maintained while still providing third party system 306 with activity information. For example, a user may not want third party system 306 to receive the exact location of wireless device 301. Thus, the user may limit the precision of the location provided to third party 306 (e.g. only provide a city, rather than zip code, where wireless device 301 is located). Similarly, the user may not want to provide specifics about applications used on wireless device 301 (if application information was requested by third party system 306), so the user may indicate that only a type of application, rather than a specific application name, be provided to third party system 306.

After receiving the conditions from the user, wireless device 301 transfers a response to the offer that includes the conditions. Upon receiving the response, control system 305 provides activity information for wireless device 301 to third party system 306 in accordance with the limitations, if any, included in the response. Of course, if the response indicated that no activity information should be provided to third party system 306, then control system 305 does not provide activity information to third party system 306.

Figure 5:
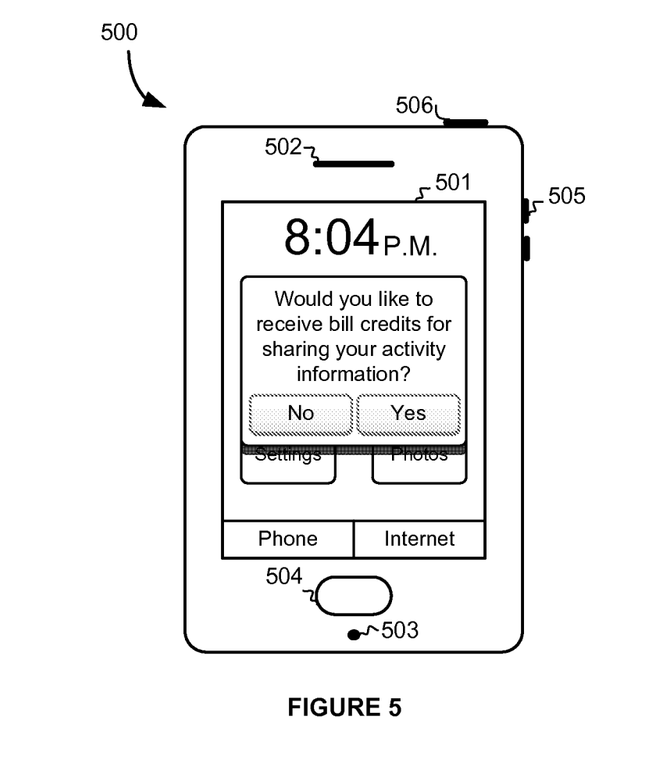
FIG. 5 illustrates a wireless communication device for providing wireless device activity information to a third party based on acceptance of an offer presented to a user.

FIG. 5 illustrates wireless communication device 500 in an exemplary embodiment for presenting an offer to a user of a wireless device. Wireless communication device 500 includes touchscreen display 501, speaker 502, microphone 503, menu button 504, volume buttons 505, and sleep/wake button 506. Wireless communication device may include additional elements not depicted in FIG. 5, such as a camera, additional buttons, keyboard, among other items.

In this embodiment, upon wireless device 500 performing an activity that satisfies a trigger condition, as discussed above, wireless device 500 displays a popup notification on display 501 that presents an offer to provide activity information to a third party. In some embodiments, the offer further indicates to which third party the activity information will be provided. The user is then able to select yes or no in answer to the offer. If the user selects no, then wireless device 500 transfers a response to the offer that indicates that the user does not wish to provide activity information to the third party. If the user selects yes, then wireless device 500 transfers a response to the offer that indicates that the user does wish to allow activity information to be provided to the third party. Alternatively, upon the user selecting yes, wireless device 500 may present the user with available conditions on provision of activity information, as discussed below.

Figure 6:
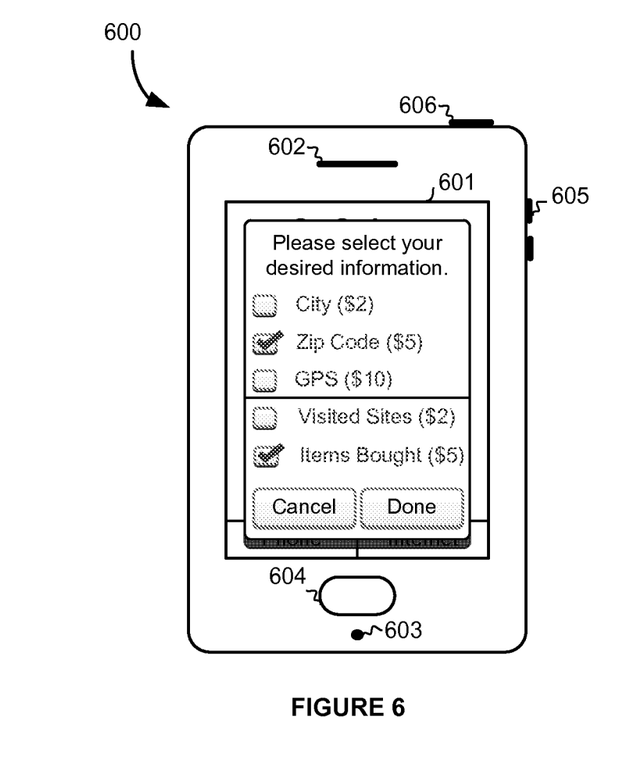
FIG. 6 illustrates a wireless communication device for providing wireless device activity information to a third party based on acceptance of an offer presented to a user.

FIG. 6 illustrates wireless communication device 600 in an exemplary embodiment for presenting an offer to a user of a wireless device. Wireless communication device 600 includes touchscreen display 601, speaker 602, microphone 603, menu button 604, volume buttons 605, and sleep/wake button 606. Wireless communication device may include additional elements not depicted in FIG. 6, such as a camera, additional buttons, keyboard, among other items.

Wireless device 600 is an example of wireless device 500 after the user has selected yes in response to the offer. After selecting yes, the user is presented with conditions that the user may place on the provision of the activity information. In this embodiment, the conditions each correspond to a monetary amount (e.g. bill credits) that the user will receive for providing activity information under each respective condition. Specifically, the user is given options regarding the precision of location information provided to the third party and the precision of web browsing activity provided to the third party. Higher compensation amounts correspond to more precise information. In this example, the user indicates that he or she is willing to provide location precision to the zip code level of precision for $5 and web browsing activity to the items bought level of precision for another $5. Upon selecting done, a response is transferred by wireless device 500 indicating the user's acceptance of the offer and the indicated conditions. Activity information is then provided for wireless device 600 to the third party in accordance with the selected conditions.

Figure 7:
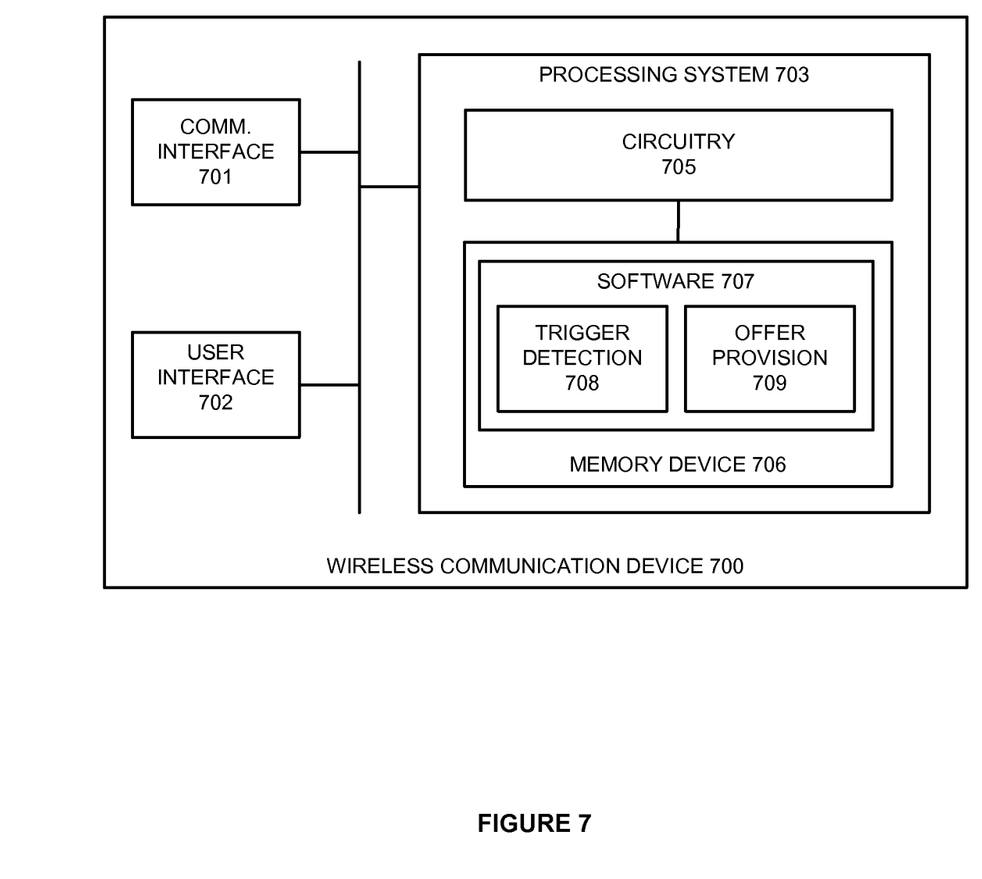
FIG. 7 illustrates a wireless communication device for providing wireless device activity information to a third party based on acceptance of an offer presented to a user.

FIG. 7 illustrates wireless communication device 700. Wireless communication device 700 is an example of wireless communication device 101, although device 101 could use alternative configurations. Wireless communication device 700 comprises wireless communication interface 701, user interface 702, and processing system 703. Processing system 703 is linked to wireless communication interface 701 and user interface 702. Processing system 703 includes processing circuitry 705 and memory device 706 that stores operating software 707. Wireless communication device 700 may include other well-known components such as a battery and enclosure that are not shown for clarity. Wireless communication device 700 may be a telephone, computer, e-book, mobile Internet appliance, media player, game console, wireless network interface card, or some other wireless communication apparatus—including combinations thereof.

Wireless communication interface 701 comprises RF communication circuitry and an antenna. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as CDMA, EVDO, WIMAX, GSM, LTE, WIFI, HSPA, or some other wireless communication format.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes trigger detection module 708 and offer provision module 709. Operating software 707 may further include an operating system, utilities, drivers, network interfaces, applications, or some other type of software. When executed by processing circuitry 705, operating software 707 directs processing system 703 to operate wireless communication device 700 as described herein.

In particular, trigger detection module 708 directs processing system 703 to detect an occurrence of one of a plurality of trigger conditions, wherein each of the trigger conditions corresponds to at least one activity performed by wireless communication device 700. Offer provision module 709 directs processing system 703 to present, via user interface 702, a user of wireless communication device 700 with an offer to provide device activity information for wireless communication device 700 to a third party and receive a response to the offer from the user, wherein the response comprises an indication of whether the user desires to accept the offer.

Figure 8:
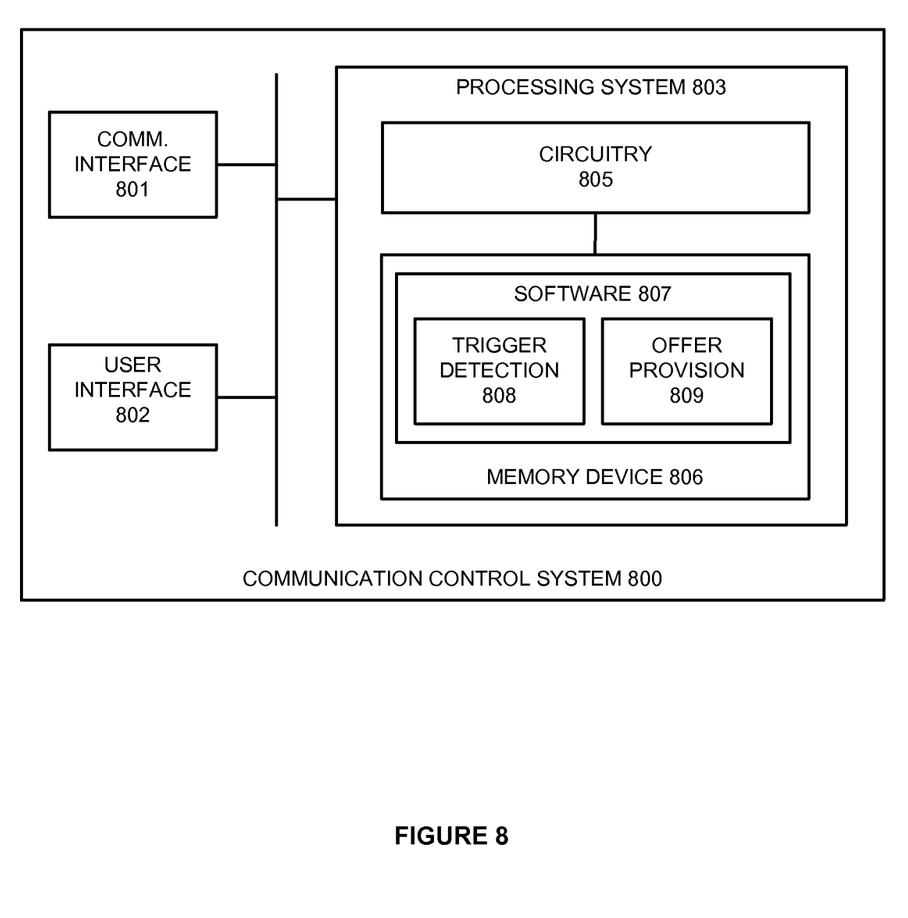
FIG. 8 illustrates a communication control system for providing wireless device activity information to a third party based on acceptance of an offer presented to a user.

FIG. 8 illustrates communication control system 800. Communication control system 800 is an example of communication control system 103, although control system 103 may use alternative configurations. Communication control system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes trigger detection module 808 and offer provision module 809. Operating software 807 may further include an operating system, utilities, drivers, network interfaces, applications, or some other type of software. When executed by circuitry 805, operating software 807 directs processing system 803 to operate communication control system 800 as described herein.

In particular, trigger detection module 808 directs processing system 803 to detect an occurrence of one of a plurality of trigger conditions, wherein each of the trigger conditions corresponds to at least one activity performed by a wireless communication device. In response to detecting the occurrence, offer provision module 809 directs processing system 803 to transfer a notification of the occurrence to the wireless communication device via communication interface 801, wherein, in response to receiving the notification of the occurrence, the wireless communication device presents a user of the wireless communication device with an offer to provide device activity information for the wireless communication device to a third party, and receive a response to the offer from the user, wherein the response comprises an indication of whether the user desires to accept the offer The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
    in a processing system, monitoring communications of a wireless communication device to detect an occurrence of the wireless communication device moving into a designated geographic area and visiting a designated website by a web browser on the wireless communication device while in the designated geographic area;
    in response to detecting the occurrence, in a display system, presenting a user of the wireless communication device with an offer to provide previously visited website data for the wireless communication device to a third party in exchange for billing credits, wherein presenting the offer comprises a pop-up notification of the offer; and
    receiving a response to the offer from the user, wherein the response comprises an indication of whether the user desires to accept the offer.

2. The method of claim 1, wherein the previously visited website data is provided for a designated time period.

3. The method of claim 1, further comprising:
    providing the previously visited website data to the third party based upon the response to the offer.

4. The method of claim 1, wherein different levels of billing credits correspond to different conditions placed, by the user, upon provision of the previously visited website data to the third party.

5. The method of claim 4, wherein the user is presented with the different levels of billing credits when determining whether to accept the offer.

6. A wireless communication system, comprising:
    a processing system configured to monitor communications of a wireless communication device to detect an occurrence of the wireless communication device moving into a designated geographic area and visiting a designated website by a web browser on the wireless communication device while in the designated geographic area;
    a communication interface configured to, in response to detecting the occurrence, transfer a notification of the occurrence to the wireless communication device, wherein, in response to receiving the notification of the occurrence, the wireless communication device presents a user of the wireless communication device with an offer to provide previously visited website data for the wireless communication device to a third party in exchange for billing credits, and receive a response to the offer from the user, wherein the offer comprises a pop-up notification and the response comprises an indication of whether the user desires to accept the offer.

7. The wireless communication system of claim 6, further comprising:
    the communication interface configured to provide the previously visited website data to the third party based upon the response to the offer.

8. The wireless communication system of claim 6, wherein different levels of billing credits correspond to different conditions placed, by the user, upon provision of the previously visited website data to the third party.

9. The wireless communication system of claim 8, wherein the user is presented with the different levels of billing credits when determining whether to accept the offer.

10. A wireless communication device, comprising:
    a processing system configured to monitor communications of the wireless communication device to detect an occurrence of the wireless communication device moving into a designated geographic area and visiting a designated website on a web browser of the wireless communication device while in the designated geographic area;
    a user interface configured to present a user of the wireless communication device with an offer to provide previously visited website data for the wireless communication device to a third party in exchange for billing credits, and receive a response to the offer from the user, wherein the offer comprises a pop-up notification and the response comprises an indication of whether the user desires to accept the offer.

* * * * *